United States Patent [19]

Tano et al.

[11] 4,382,669
[45] May 10, 1983

[54] DISABLEMENT OF SHUTTER RELEASE IN PHOTOGRAPHIC CAMERA HAVING INTERCHANGEABLE OBJECTIVES

[75] Inventors: Eiichi Tano, Kamifukuoka; Tetsuji Shono, Kawagoe, both of Japan

[73] Assignee: Asahi Kogaku Kogyo Kabushiki Kaisha, Tokyo, Japan

[21] Appl. No.: 285,915

[22] Filed: Jul. 23, 1981

[30] Foreign Application Priority Data

Jul. 25, 1980 [JP] Japan ............................ 55-105935[U]

[51] Int. Cl.³ ............................................. G03B 17/38
[52] U.S. Cl. .................................... 354/268; 354/286
[58] Field of Search ................... 354/23 D, 60 R, 234, 354/235, 268, 286, 289, 46

[56] References Cited

U.S. PATENT DOCUMENTS 3,525,292  8/1970  Okamoto ............................ 354/268
4,118,713  10/1978  Murakami et al. ............. 354/286 X Primary Examiner—William B. Perkey
Attorney, Agent, or Firm—Christie, Parker & Hale

[57] ABSTRACT

A photographic camera of interchangeable lens type has an interchangeable objective that can be removably mounted on a camera body and a plurality of switches each capable of assuming a first or a second state. The switches all assume the same state when the objective is removed from the camera body and selectively assume the first and second states according to the value of at least one lens characteristic when the objective is mounted on the camera body. An automatic exposure control mechanism is operated responsive to the selectively assumed states of the switches when the objective is mounted on the camera body. A shutter release mechanism is disabled responsive to said same state of all the switches.

5 Claims, 4 Drawing Figures

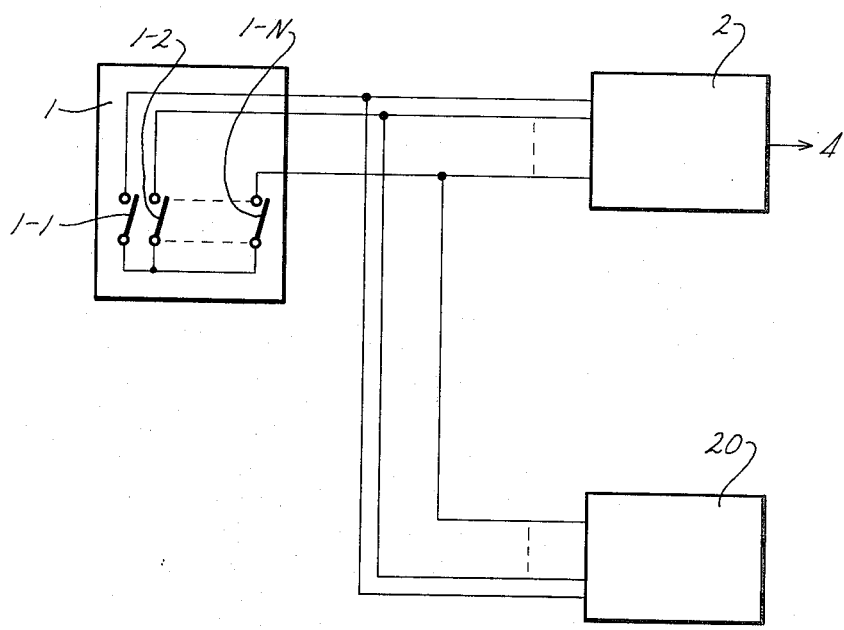

4,382,669

DISABLEMENT OF SHUTTER RELEASE IN PHOTOGRAPHIC CAMERA HAVING INTERCHANGEABLE OBJECTIVES

BACKGROUND OF THE INVENTION

This invention relates to photographic cameras of the interchangeable lens type and, more particularly, to an arrangement to disable operation of the shutter release in such a camera.

In a single lens reflex camera of interchangeable lens type, the shutter is sometimes unintentionally depressed due to careless handling of the camera during exchange of lens, resulting in wasteful use of film. To avoid this problem, there has conventionally been proposed a mechanical method by which a member adapted to arrest the shutter button against depression is forced by the objective to be released as said objective is mounted on the camera body, but is restored to its arresting position as the objective is removed from the camera body. Thus, depression of the shutter button is not possible because of the depression arresting member. However, with the arresting method of such mechanical arrangement, a mechanism extending from the camera body mount to the shutter release button which governs the operation of shutter release is incorporated with members adapted for mechanical transmission and elements for automatic restoration thereof, leading to many difficulties to efficiently incorporate the members and elements into the limited space available within the camera body. Such difficulties have made practical use of the described mechanical arrangement almost impossible. A new photographic system has recently been introduced, according to which an arithmetic circuit incorporated in the camera is activated by a battery also accomodated by the camera to effect an automatic exposure control. Particularly a photographic camera of so-called automatic diaphragm control type has recently been placed on the market, with which a shutter speed is selected and preset by the operator so that the diaphragm of the individual objective actually mounted on the camera is automatically controlled in accordance with said preset shutter speed. With such camera, an electrical information transmitting system has been realized, in accordance with which the information such as the aperture values peculiar to the individual objective mounted on the camera is transmitted to the camera body through mutual contact of corresponding pairs of electric contacts arranged on portions of the objective mount and the camera body mount, respectively, to be coupled to each other. As a result, it has become easy to use said electrical information transmitting system arranged along the interface of the objective mount and the camera body mount as the method to permit and disable the operation of shutter release depending upon the presence or absence of a properly mounted objective on the camera. Namely, the most straightforward arrangement might be such that an electromagnetic release circuit adapted for direct control of the operation of shutter release is closed and opened by a switch comprising a pair of associated contacts each arranged on the objective mount and the camera body mount, respectively, so that engagement and disengagement of these contacts control the release circuit. However, such an arrangement requires separate provision of a pair of contacts exclusively for the shutter release control, which is inconvenient because of the limited area of the interface between objective and camera body.

SUMMARY OF THE INVENTION

According to the invention, a photographic camera of interchangeable lens type has an interchangeable objective that can be removably mounted on a camera body and a plurality of switches each capable of assuming a first or a second state. The switches all assume the same state when the objective is removed from the camera body and selectively assume the first and second states according to the value of at least one lens characteristic when the objective is mounted on the camera body. An automatic exposure control mechanism is operated responsive to the selectively assumed states of the switches when the objective is mounted on the camera body. A shutter release mechanism is disabled responsive to said same state of all the switches. Thus, the shutter release cannot be accidentally operated when the objective is removed from the camera body, thereby preventing wasteful use of film.

BRIEF DESCRIPTION OF THE DRAWINGS

The features of a specific embodiment of the best mode contemplated of carrying out the invention are illustrated in the drawings, in which:

FIG. 4 is a schematic block diagram of a portion of the arrangement of FIG. 2 showing the connections to an automatic exposure control mechanism in the camera body.

DETAILED DESCRIPTION OF THE SPECIFIC EMBODIMENT

Figure 1:
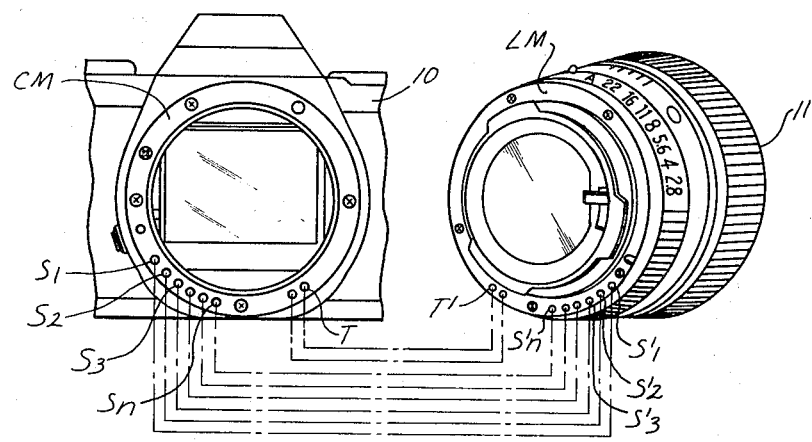
FIG. 1 illustrates a camera body and an interchangeable lens assembly including the lens and body mounts and contact pairs.

This aspect will be described by way of specific example. In application Ser. No. 229,879 filed Jan. 30, 1981, the error of illuminance in the film plane occurring as a result of the individual interchangeable objective and the error of illuminance occurring at the position of the light receiving element particular to said individual objective are effectively compensated in an automatic diaphragm control operation. The disclosure of this application is incorporated fully herein by reference. According to the present invention, there are provided, as shown by FIG. 1, an electrical contact T for the minimum aperture value and a plurality of electrical contacts $S_1$, $S_2$ ... for the fully opened, i.e., maximum aperture value signal on a mount CM of the camera body, on one side, and an electrical contact T' for the minimum aperture value signal and matching, i.e., aligned, electrical contacts $S_1'$, $S_2'$ ... for the fully opened aperture value signal on a mount LM of the objective. Contacts T' and $S_1'$, $S_2'$ ... pair with contacts T and $S_1$, $S_2$ ... to transmit the minimum aperture value signal peculiar to the individual objective actually mounted on the camera from the objective to an electrical circuit in the camera body and to transmit a signal representative of the fully opened aperture value of said individual objective from the objective to the circuit in the camera body. The electrical contacts on mount CM and mount LM could be constructed in the manner disclosed in the application Ser. No. 237,987 filed Feb.

25, 1981, the disclosure of which is incorporated fully herein by reference. However, separate provision of a further pair of contacts to control the shutter release depending on presence and absence of an objective mounted on the camera body, in addition of the many other contacts within the limited area available on the mount interface, not only increases the mechanical complexity but also disadvantageously affects the wiring arrangement.

As disclosed in the above-identified application, the contacts for transmission of information concerning the fully opened aperture value signal and the minimum aperture value signal, are utilized to produce on/off signals based on which it is determined whether a proper exposure is given by a combination of the preset shutter speed with an aperture value lying between the fully opened aperture value and the minimum aperture value. Instead of providing a separate pair of contacts opposed to each other exclusively for the shutter release control, the present invention proposes prevention of unintentional or accidental exposure by utilizing existing pairs of contacts in cooperation with a separate circuit connected to said contacts so that the operation of shutter release is effectively prevented when an objective is not mounted on the camera body. According to the present invention, specifically, the pairs of opposed contacts arranged on both the camera body mount CM and the objective mount LM to be brought into mutual contact as these mounts are coupled to each other are provided with release switches that are all in the same state without an objective mounted on the camera body. To detect this condition, there is provided a detector circuit in which the information signal output is subjected to logical operation together with the on-/off signal produced from a release switch; a release magnet is controlled on the basis of the result of said logical operation.

Figure 2:
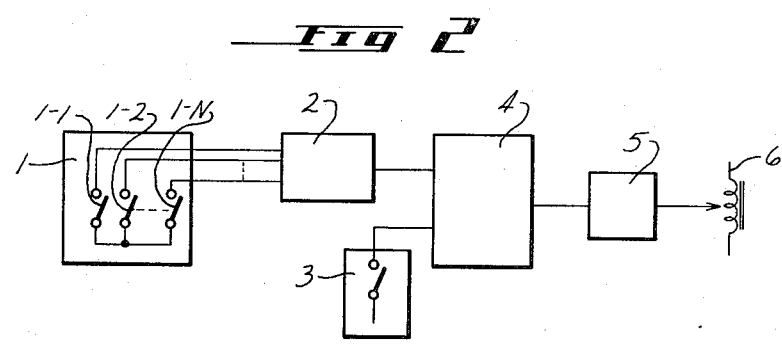
FIG. 2 is a schematic block diagram of an arrangement for disabling shutter release.
Figure 3:
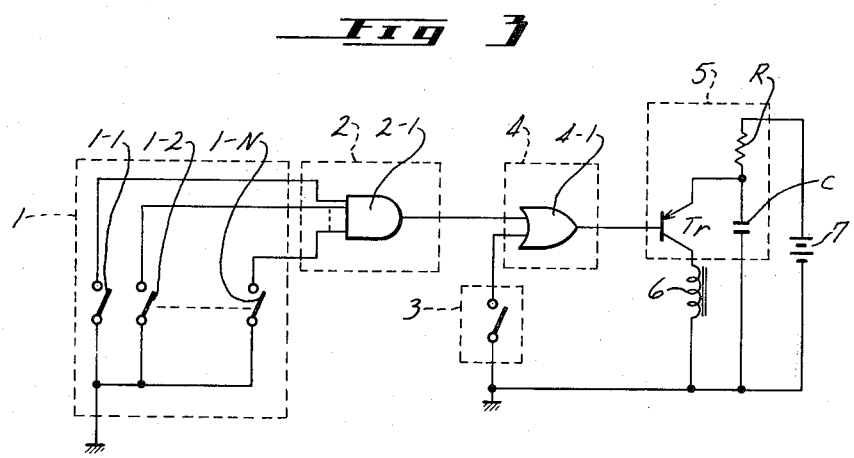
FIG. 3 is a schematic circuit diagram of the arrangement of FIG. 2.

FIG. 2 is a block diagram illustrating an embodiment of the present invention and FIG. 3 is a circuit diagram illustrating this embodiment, in which identical members are designated by common reference numerals and symbols. Reference numeral 1 designates a group of switches comprising a plurality of switches 1-1, 1-2 ... 1-N adapted to be selectively on or off as previously mentioned pairs of electrical contacts $S_1$, $S_2$ ... $S_1'$, $S_2'$ ... and also previously mentioned pair of electrical contacts T, T' are brought into mutual contact, respectively. The respective switches 1-1, 1-2 ... 1-N are connected to a detector circuit 2 so that, when every switch 1-1, 1-2 ... 1-N is in the same state, i.e., either on or off, said detector circuit 2 applies its detection signal to one input terminal of a logic circuit 4. To the other input terminal of the logic circuit 4, a release switch 3 is connected; on/off signals produced from this switch 3 are applied to logic circuit 4. Logic circuit 4 performs a logical operation on the detection signal and the release switch signal and then provides its output signal based on the result of this logical operation to a magnet driving circuit 5 adapted to drive a release magnet 6.

As shown in FIG. 4, the switches 1-1, 1-2 ... 1-N are also connected to an automatic exposure control mechanism 20 in parallel with their connections to detector circuit 2. The on or off state of each of the switches 1-1, 1-2, ... 1-N according to the minimum aperture and the fully opened aperture values of the objective 11 is utilized by the automatic exposure control mechanism 20 for calculation. The mechanism for automatic diaphragm control is described in detail in application Ser. No. 229,879.

Although it is to be understood that switches 1-1, 1-2 ... 1-N may be arranged to be turned either on or off in response to mutual contact or breakaway of the pairs of electrical contacts as an interchangeable lens assembly, i.e., objective 11 is mounted on or removed from a camera body 10, the case in which the respective switches are arranged to be turned on when the pairs of electrical contacts are brought into mutual contact relationship will be described by way of example. In other words, when the objective 11 is fully mounted on camera body 10, switches 1-1, 1-2 ... 1-N are turned ON or OFF according to the signals of the minimum aperture and the fully opened aperture values of the objective 11, and when objective 11 is completely removed from camera body 10, switches 1-1, 1-2 ... 1-N are all turned OFF. A terminal common to all of switches 1-1, 1-2 ... 1-N is connected to the minus, i.e., ground, side of a power source 7 and these switches are turned on in response to the mutual contacting relationship of the pairs of electrical contacts, resulting in application of signals L (a lower potential) to corresponding input terminals of detector circuit 2, which comprises an AND circuit. When objective 11 is completely mounted on camera body 10, at least one of switches 1-1, 1-2 ... 1-N is turned on according to the information about the lens aperture value and the corresponding signals L are applied to the respective input terminals of detector circuit 2. As a result, a signal L appears on the output terminal of detector circuit 2 which is applied to an input terminal of a logic circuit 4. Logic circuit 4 comprises an OR gate 4-1 and has its other input terminal connected to release switch 3, as previously mentioned. This release switch 3 has its other terminal grounded. When detector circuit 2 produces a detection signal L and the release switch 3 produces an on/off signal L (corresponding to the on-state), logic circuit 4 produces a signal L. In response to an on/off signal H (a higher potential, and corresponding to the off-state of the release switch 3), on the other hand, the output of logic circuit 4 also has a signal H since release switch 3 applies a signal H to logic circuit 4. Magnet driving circuit 5 comprises a transistor Tr, a capacitor C, and a resistor R. The output terminal of said logic circuit 4 is connected to the base of transistor Tr; its collector is connected through said release magnet 6 to ground; its emitter is connected through said capacitor C to ground and through resistor R to the positive terminal of power source 7. Capacitor C is charged from source 7 and resistor R functions to adjust the charging time constant of capacitor C. So long as the output of logic circuit 4 has a signal H, transistor Tr remains disabled. When a signal L appears on the base of the transistor Tr, the latter is enabled to pass electric charge stored on capacitor C through release magnet 6 and thus to release the shutter.

With the objective completely removed from the camera body, a signal H appears on all the respective input terminals of the detector circuit 2, since all of switches 1-1, 1-2 ... of the group of switches 1 are in the off-state. In consequence, the output of detector circuit 2 has a signal H and the output of logic circuit 4 has a signal H, even when release switch 3 is turned on and applies a signal L to the other input of logic circuit 4. Thus, transistor Tr remains disabled, as previously mentioned, and the shutter is reliably prevented from being released.

However, it is possible of course to arrange all of switches 1-1, 1-2, . . . , 1-N so that they are turned OFF upon connection of electrical contacts, rather than ON.

Further, it is also possible to implement detector circuit 2 and logic circuit 4 by gates of the other types or to connect switches 1-1, 1-2 . . . 1-N to the plus side of the battery at one end of each switch, rather than the negative side.

With the construction according to the present invention, as described and illustrated, the operation of the shutter release can only occur when the objective is completely mounted on the camera body, e.g., by so-called screw-joint or bayonet joint; operation of the shutter release is reliably disabled to prevent wasteful exposure of film when the objective removed from the camera body, even if the release button is unintentionally or accidentally depressed. Further, the various electronic parts used for the present invention are not bulky at all and the number thereof is relatively few, so the device of the present invention as a whole can be incorporated into the camera without requiring any significant space.

What is claimed is:

1. In a photographic camera of interchangeable lens type, the combination comprising:
    a camera body;
    an interchangeable objective;
    means for removably mounting the objective on the camera body;
    a plurality of switches each capable of assuming a first state or a second state, the switches all assuming the same state when the objective is removed from the camera body and the switches selectively assuming the first and second states according to the value of at least one lens characteristic when the objective is mounted on the camera body;
    control means responsive to the selectively assumed states of the switches for automatically controlling light exposure;
    shutter release means; and
    means responsive to said same state of all the switches for disabling the shutter release means.

2. The combination of claim 1, in which the mounting means comprises a lens mount on the objective and a body mount on the camera body, and the plurality of switches comprise a plurality of contacts on the lens mount and a plurality of matching contacts on the body mount.

3. The combination of claim 1, in which the shutter release means includes a magnet with a coil, a transistor having first and second end terminals, and a control terminal, a capacitor, and means for charging the capacitor, the end terminals of the transistor and the coil being connected in series circuit, and the capacitor being connected in parallel with said series circuit.

4. The combination of claim 3, in which the shutter release means additionally comprises a shutter release switch connected to the control terminal to render the transistor conductive between its end terminals responsive to the shutter release switch.

5. The combination of claim 4, in which the disabling means comprises means for disconnecting the shutter release switch from the control terminal.

* * * * *